US012766631B2

(12) United States Patent
Fujii et al.

(10) Patent No.: US 12,766,631 B2
(45) Date of Patent: Oct. 20, 2026

(54) FRICTION STIR WELDING METHOD

(71) Applicant: OSAKA UNIVERSITY, Osaka (JP)

(72) Inventors: Hidetoshi Fujii, Osaka (JP); Muneaki Mukuda, Osaka (JP); Yoshiaki Morisada, Osaka (JP)

(73) Assignee: OSAKA UNIVERSITY, Osaka (JP)

(*) Notice: Subject to any disclaimer, the term of this patent is extended or adjusted under 35 U.S.C. 154(b) by 0 days.

(21) Appl. No.: 18/835,902

(22) PCT Filed: Feb. 7, 2023

(86) PCT No.: PCT/JP2023/003934
§ 371 (c)(1),
(2) Date: Aug. 5, 2024

(87) PCT Pub. No.: WO2023/166925
PCT Pub. Date: Sep. 7, 2023

(65) Prior Publication Data
US 2025/0153264 A1 May 15, 2025

(30) Foreign Application Priority Data
Mar. 4, 2022 (JP) ................................ 2022-033462

(51) Int. Cl.
*B23K 20/00* (2006.01)
*B23K 20/12* (2006.01)
*B23K 103/10* (2006.01)

(52) U.S. Cl.
CPC ...... *B23K 20/1225* (2013.01); *B23K 2103/10* (2018.08)

(58) Field of Classification Search
CPC ........... B23K 20/1255; B23K 20/1225; B23K 20/123; B23K 20/122
See application file for complete search history.

(56) References Cited

U.S. PATENT DOCUMENTS

| | | | | |
|---|---|---|---|---|
| 10,569,356 B1* | 2/2020 | Coffey | B23K 26/361 | |
| 12,186,828 B2* | 1/2025 | Matsushita | B23K 20/123 | |
| 2001/0004989 A1* | 6/2001 | Ezumi | B23K 37/08 | 228/2.1 |
| 2003/0024965 A1* | 2/2003 | Okamura | B23K 33/00 | 228/112.1 |
| 2003/0111515 A1* | 6/2003 | Scheglmann | B23K 20/1235 | 228/2.1 |
| 2004/0041005 A1* | 3/2004 | Tanaka | B23K 20/123 | 228/112.1 |

(Continued)

OTHER PUBLICATIONS

WO2021060176A1 computer english translation (Year: 2021).*

*Primary Examiner* — Erin B Saad
(74) *Attorney, Agent, or Firm* — RANKIN, HILL & CLARK LLP

(57) ABSTRACT

The present invention provides a simple and efficient friction stir welding method that, in addition to enabling localized friction stir welding, makes it possible to obtain a smooth friction stir surface and increase tool lifespan. This friction stir welding method is characterized in that the tip end of a tool that is rotated at a prescribed speed is pressed into a material to be welded, a stir portion is formed by moving the tool in an arbitrary welding direction, and the tool is slanted toward the retreating side relative to the welding direction.

12 Claims, 19 Drawing Sheets

(56) References Cited

U.S. PATENT DOCUMENTS

| | | | | |
|---|---|---|---|---|
| 2004/0074949 | A1* | 4/2004 | Narita | B23K 20/122 228/112.1 |
| 2006/0086775 | A1* | 4/2006 | Trapp | B23K 20/1225 228/2.1 |
| 2006/0124691 | A1* | 6/2006 | Wood | B23K 20/1265 228/2.1 |
| 2006/0151576 | A1* | 7/2006 | Akiyama | B23K 33/004 228/112.1 |
| 2007/0114263 | A1* | 5/2007 | Machida | B23K 20/1245 228/10 |
| 2008/0257936 | A1* | 10/2008 | Trapp | B23K 20/124 228/2.3 |
| 2012/0227890 | A1* | 9/2012 | Yamauchi | B23K 20/1255 228/2.1 |
| 2014/0034709 | A1* | 2/2014 | Oki | B23K 20/125 228/2.1 |
| 2021/0008658 | A1* | 1/2021 | Frank | B23K 20/00 |
| 2021/0023650 | A1* | 1/2021 | Matsushita | B23K 20/1255 |
| 2021/0069838 | A1* | 3/2021 | Ano | B23P 6/04 |
| 2022/0371119 | A1* | 11/2022 | Matsushita | B23K 20/1255 |

* cited by examiner

[FIG. 1]
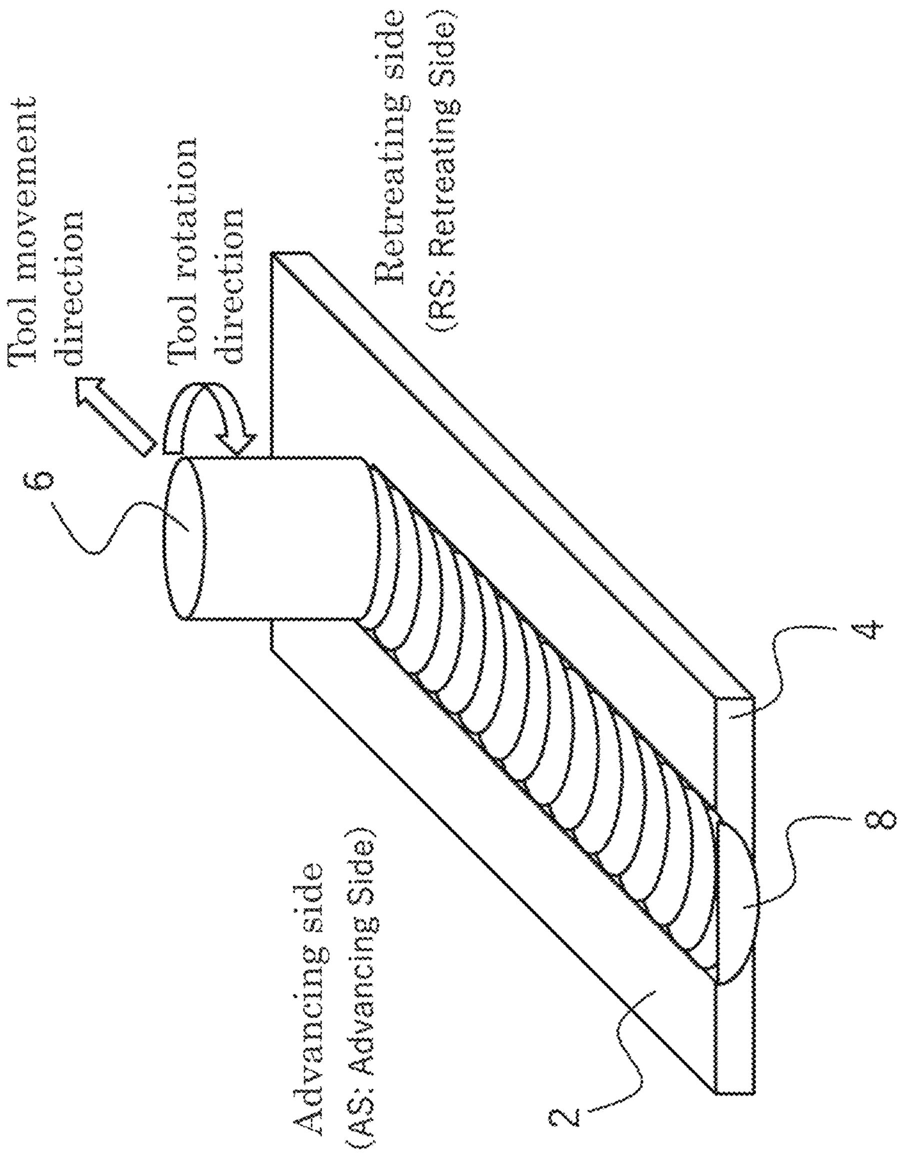

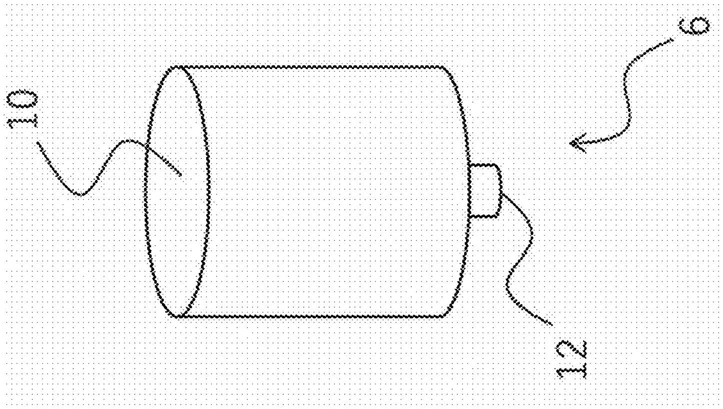
[FIG.2]

[FIG.3]
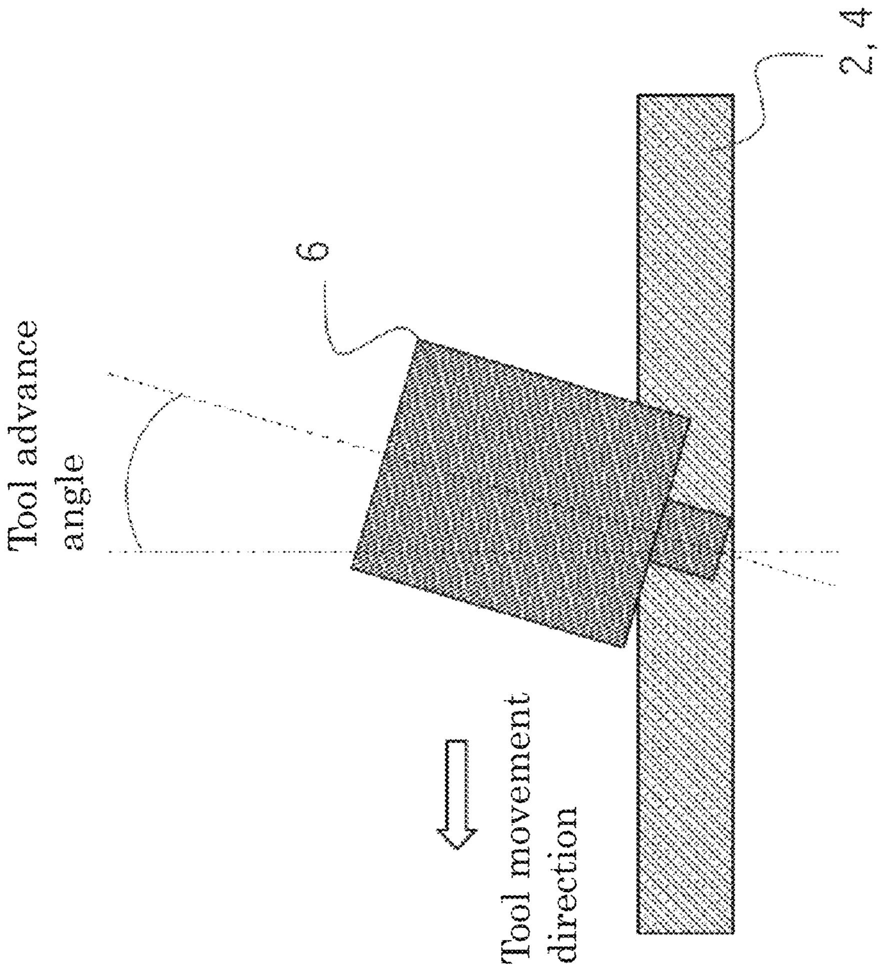

[FIG. 4]
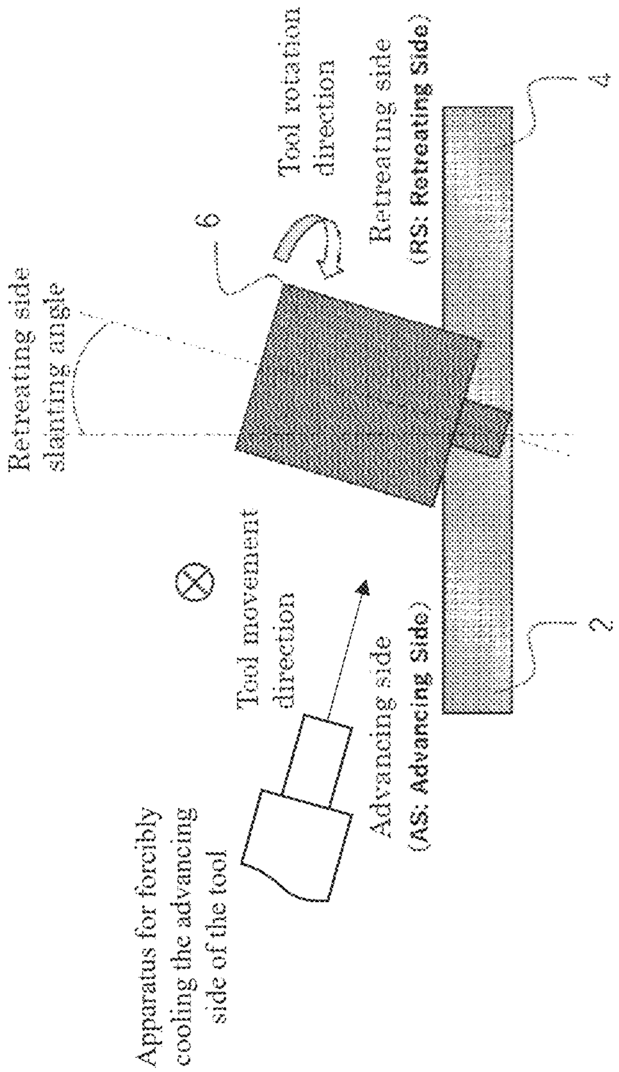

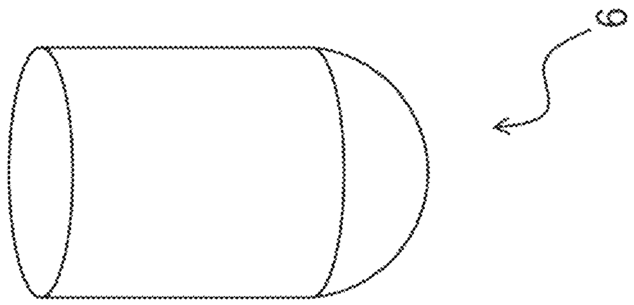
[FIG.5]

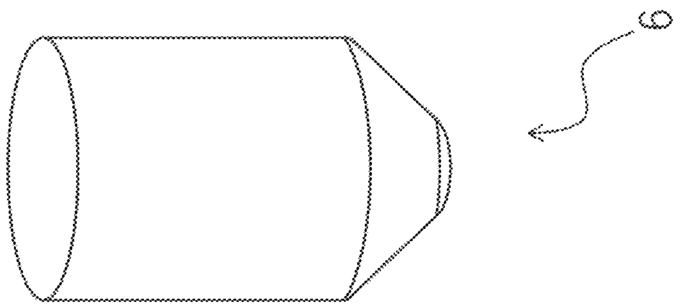
[FIG.6]

[FIG.7]
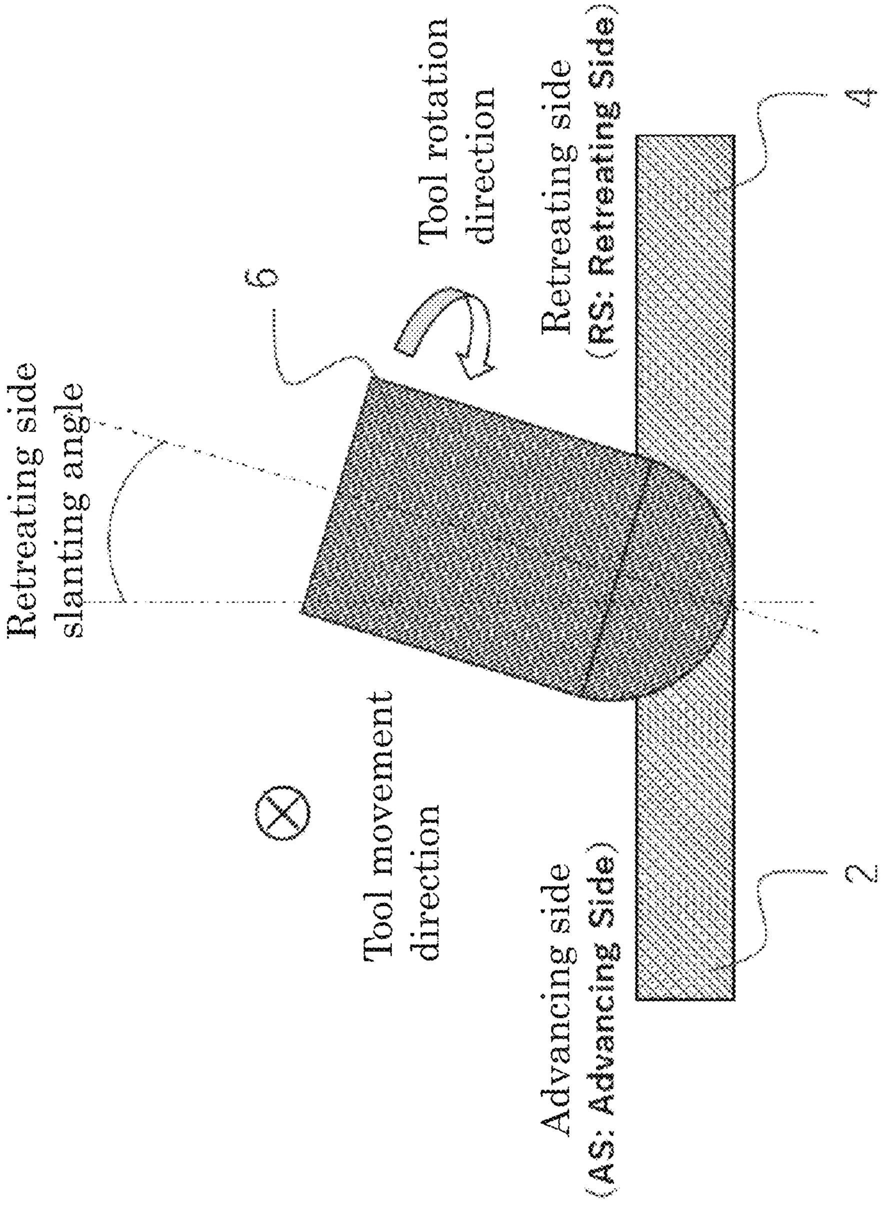

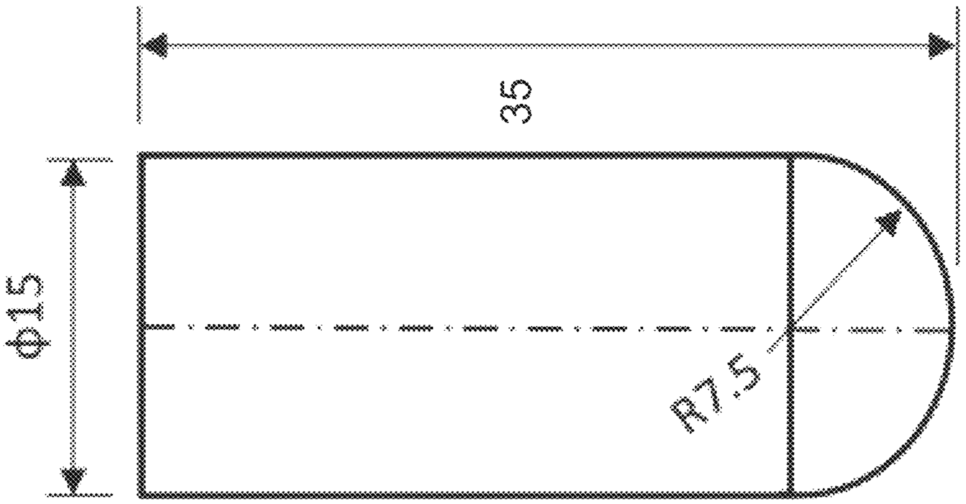
[FIG.8]

[FIG.9]
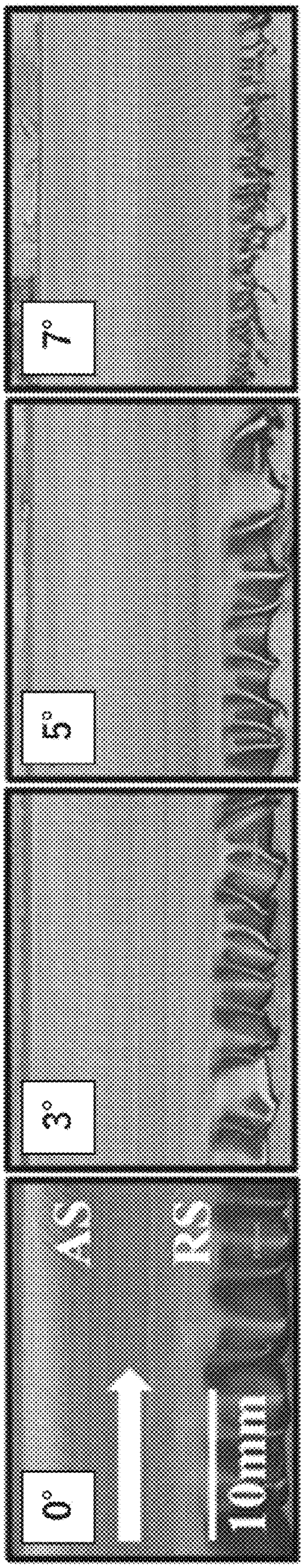

[FIG. 10]
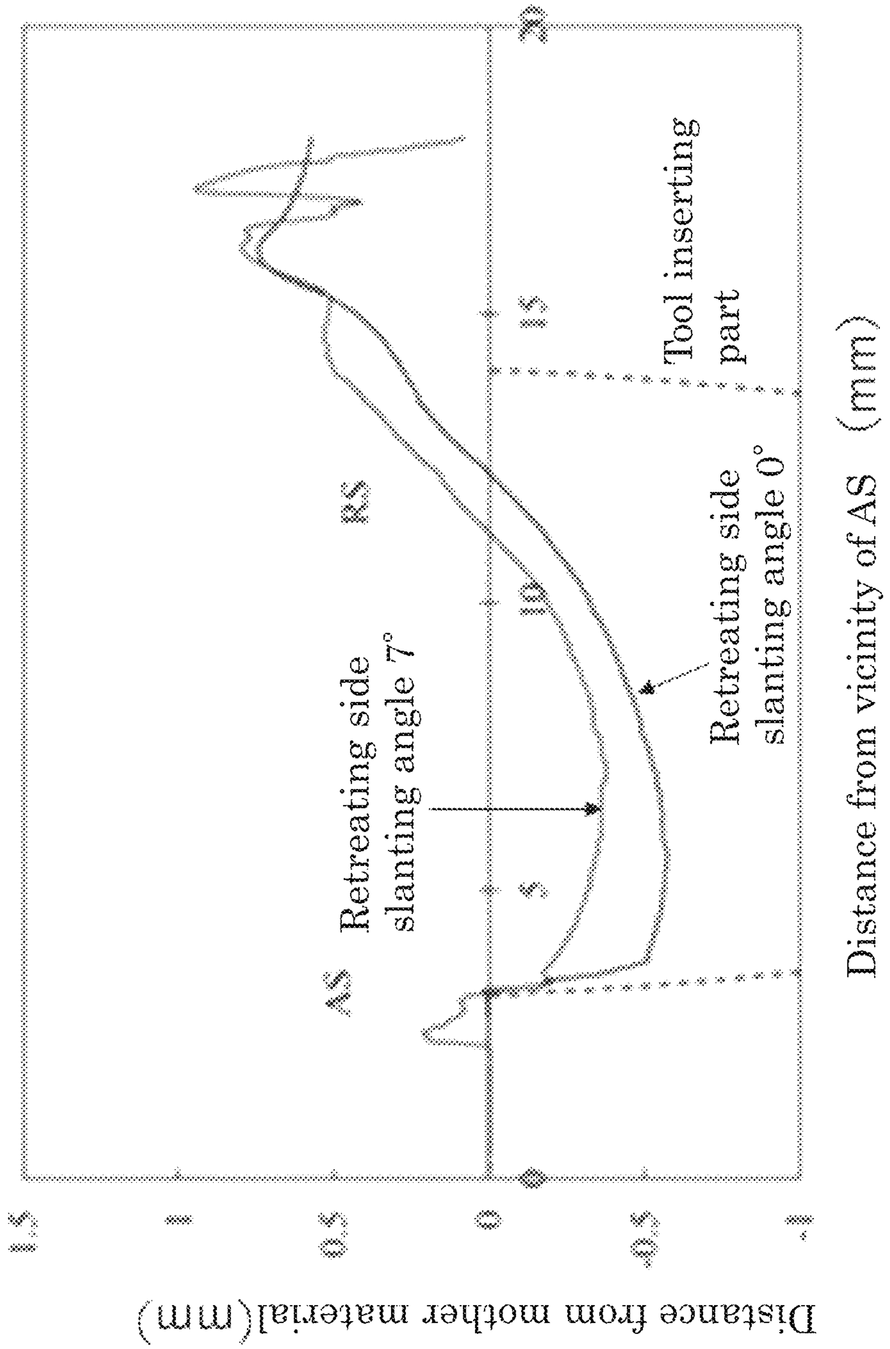

[FIG. 11]
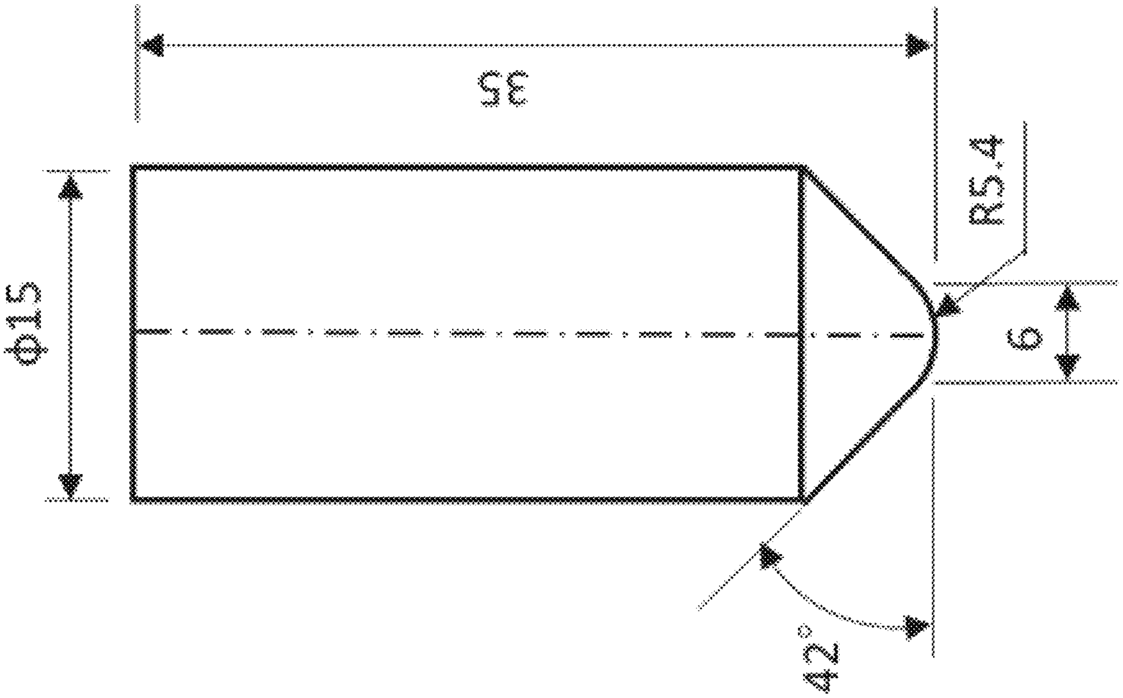

[FIG. 12]
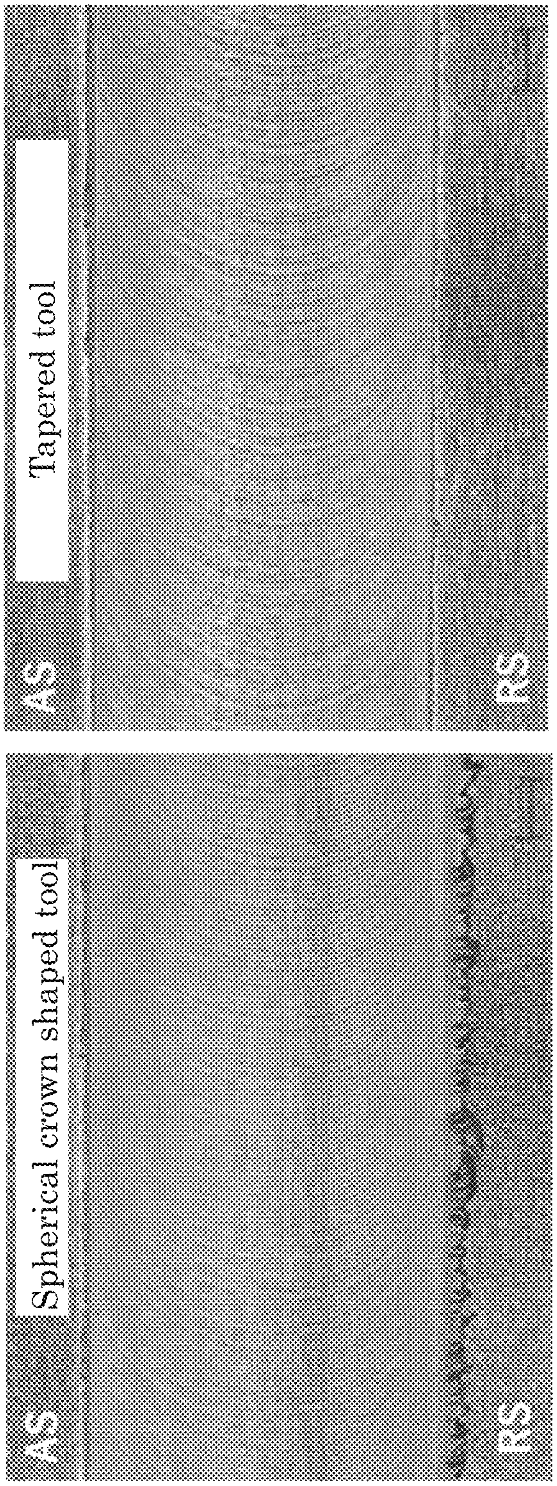

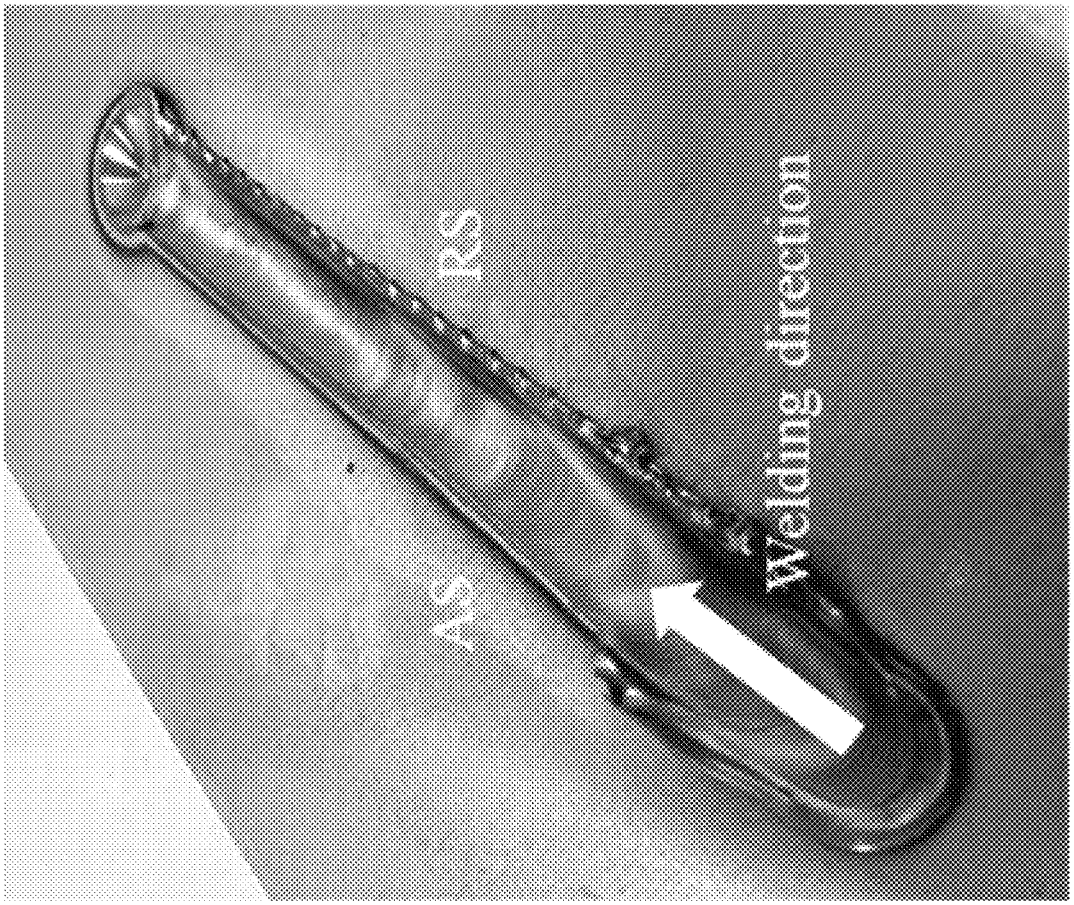
[FIG.13]

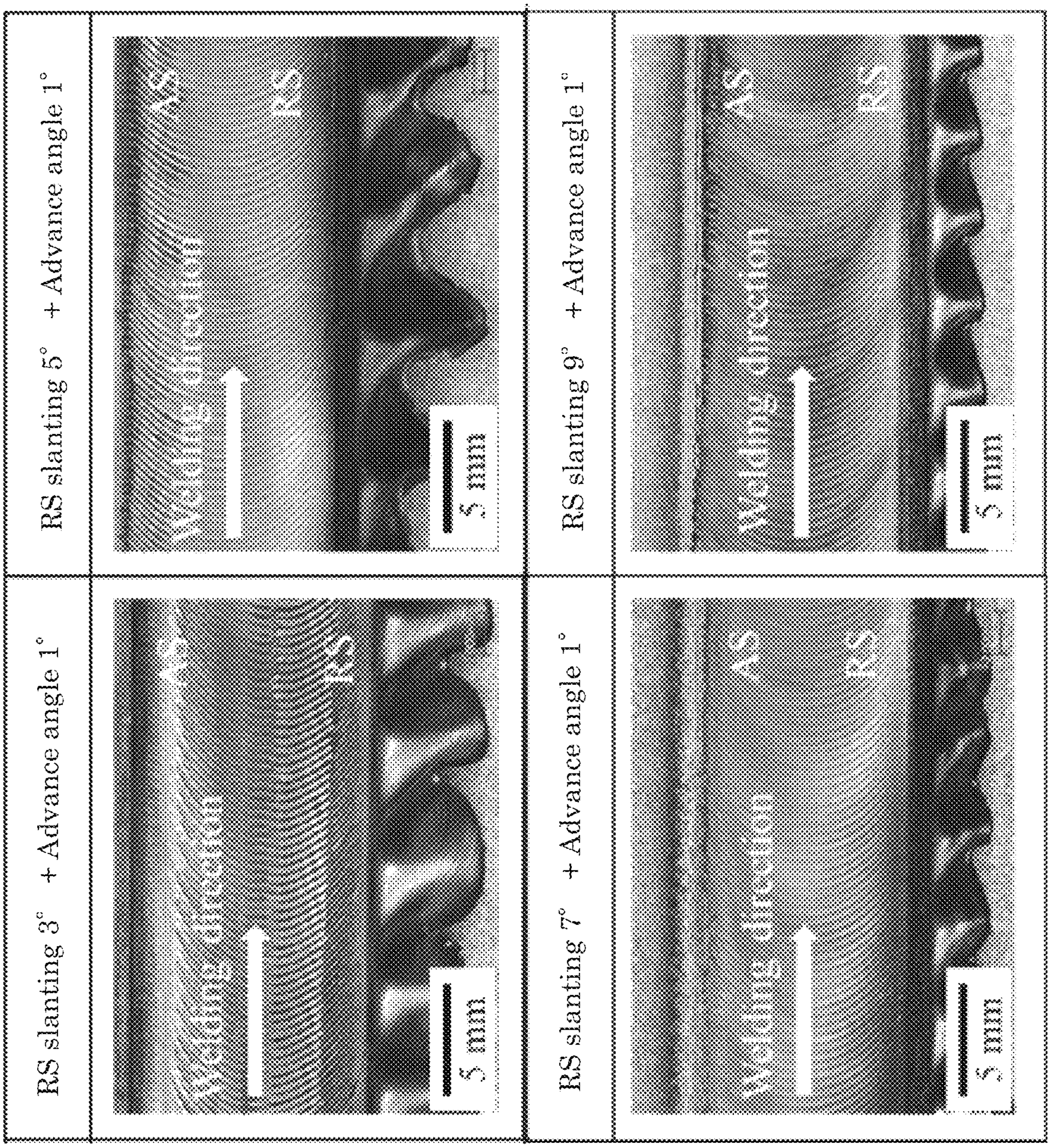
[FIG. 14]

[FIG.15]
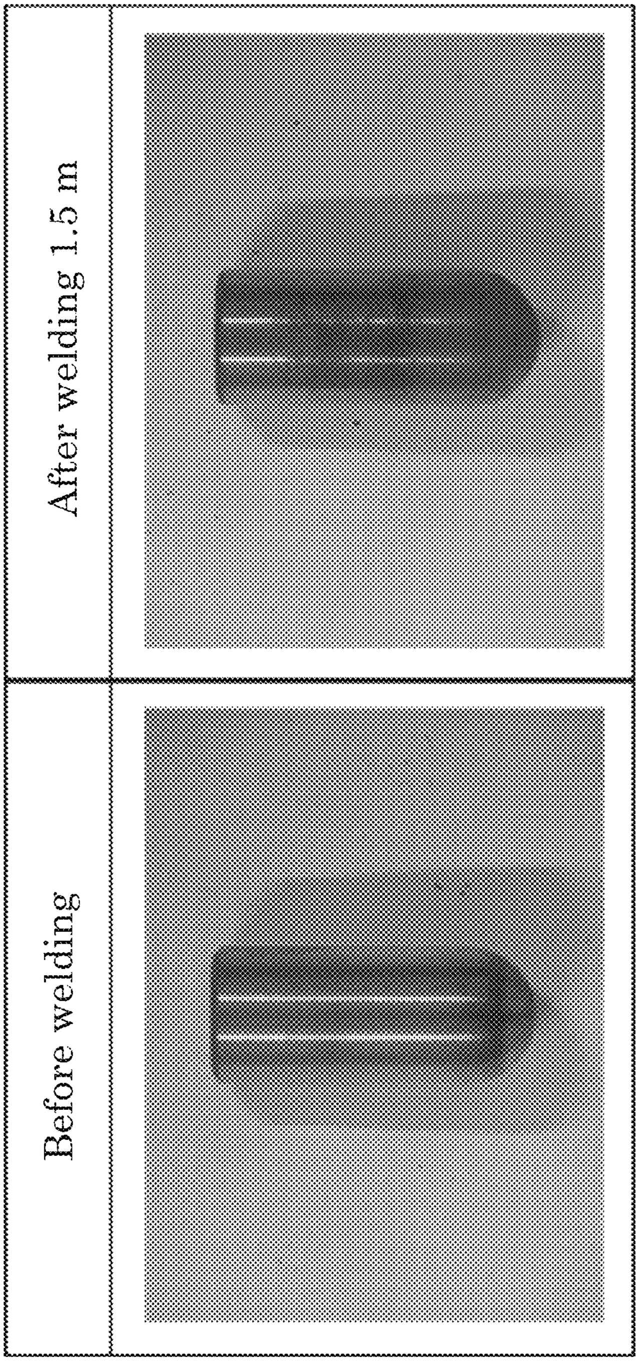

[FIG.16]
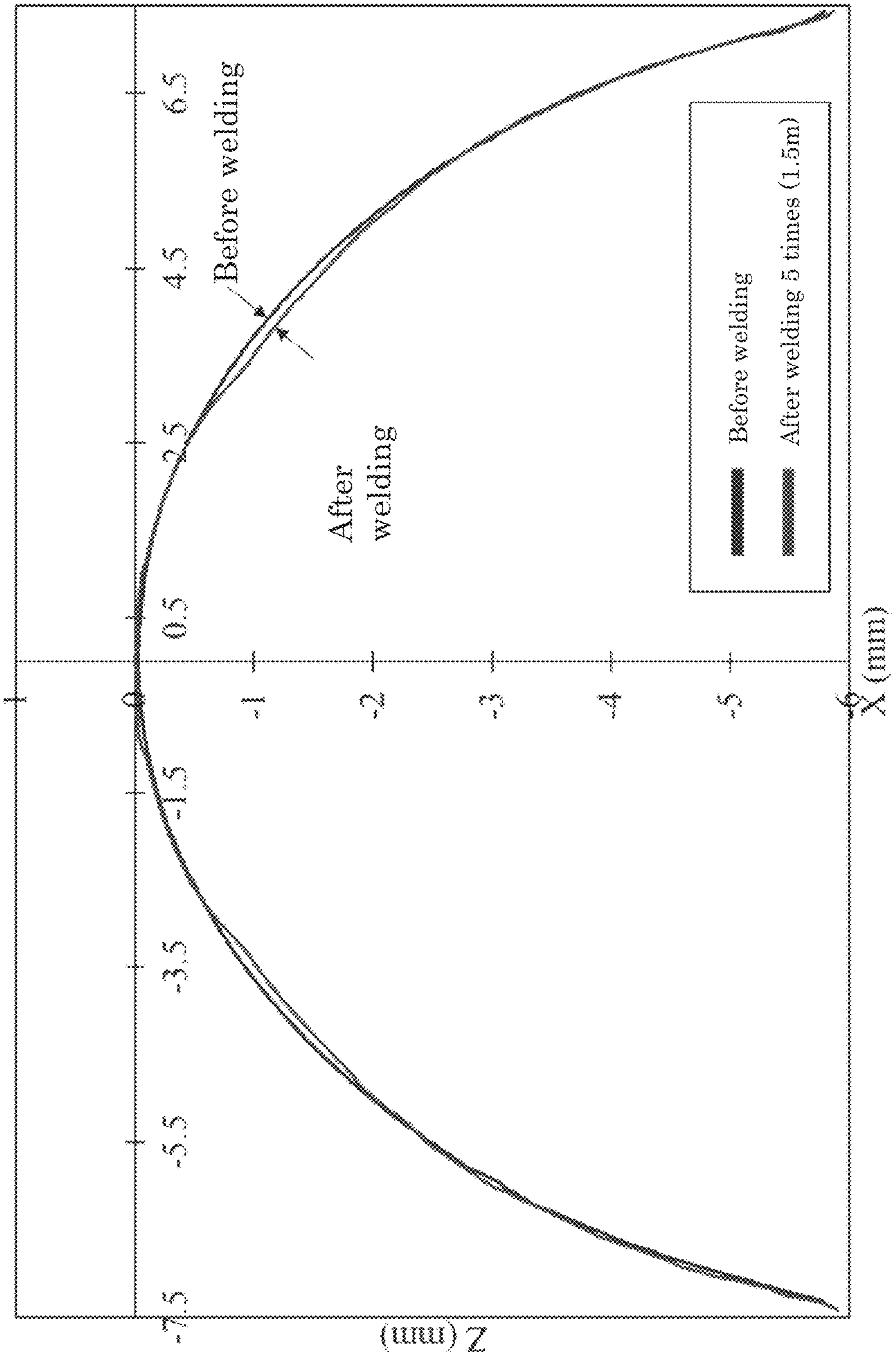

[FIG.17]
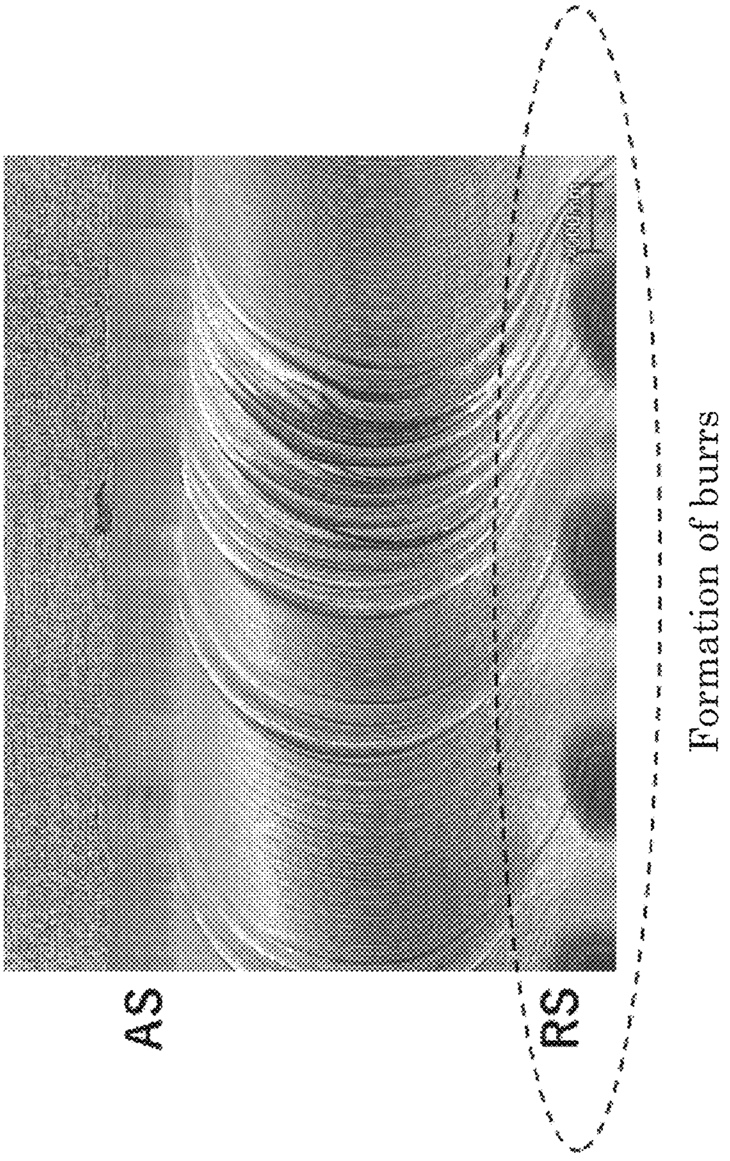

[FIG.18]
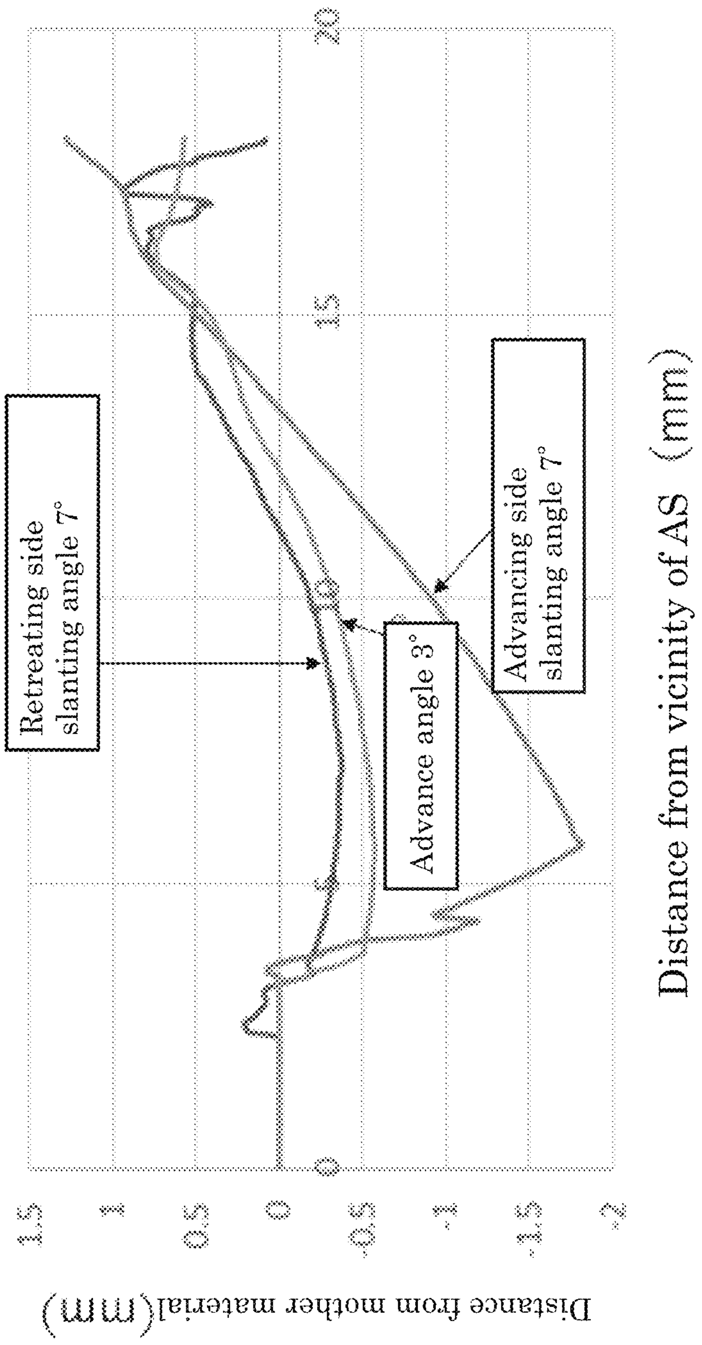

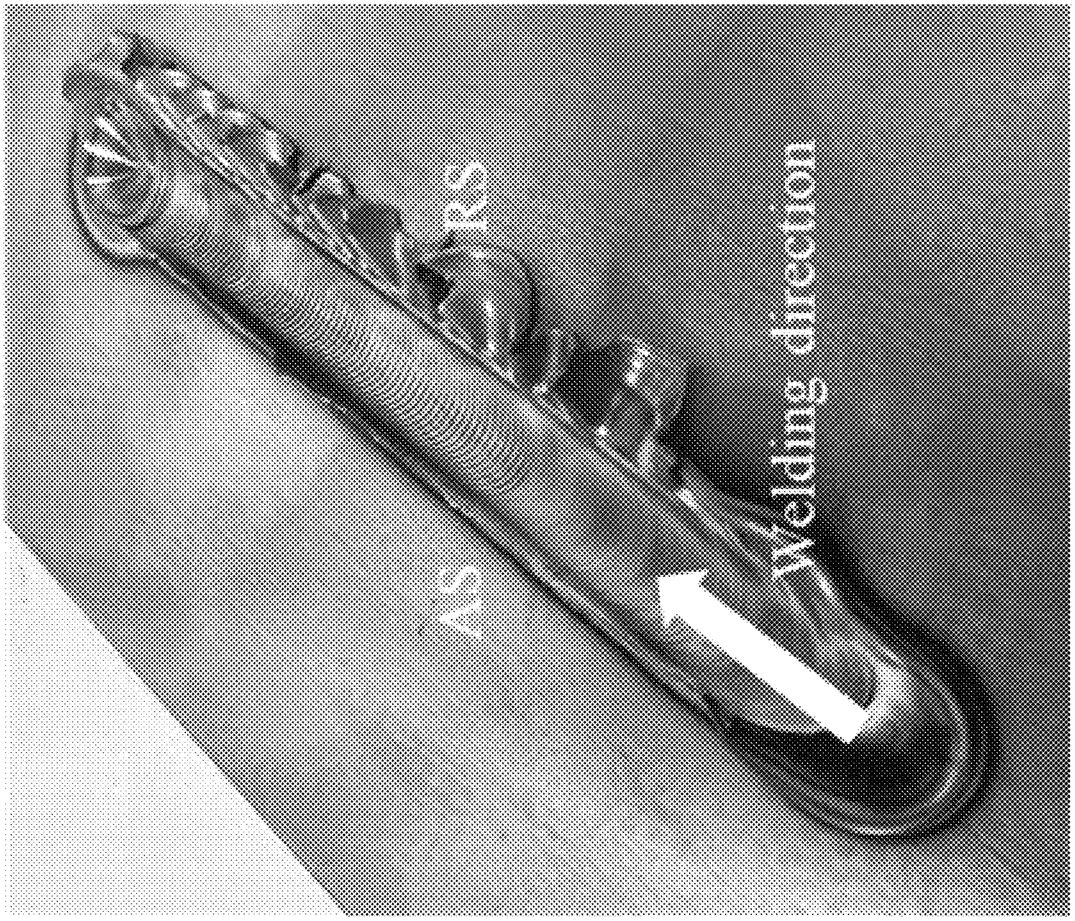
[FIG.19]

FRICTION STIR WELDING METHOD

TECHNICAL FIELD

The present invention relates to a friction stir welding method.

BACKGROUND ART

Friction stir welding (FSW) is known as a typical solid phase welding method for metal materials. In the friction stir welding, the metal materials to be welded face each other at the welding portion, the probe provided at the tip of the rotation tool is inserted into the portion to b welded, and the rotation tool is moved along the interface to be welded while rotating, whereby the metal materials are subjected to material flow due to the friction heat and the stirring force of the rotating tool, which results in welding of the two metal materials. Friction stir welding is characterized in that the maximum temperature reached during the welding does not reach the melting point of the material to be welded, and the decrease in strength at the welded portion is smaller than that of conventional melt welding, and has been rapidly put into practical use in recent years.

However, while the friction stir welding has various excellent properties, since, in addition to the need to plunge a tool that has a strength higher than that of the material to be welded, a large stress is applied to the tool, there rise big problems such as, depending on the material to be welded, cost and life of the tool.

Further, conventional tools generally have a shoulder portion (main body) and a probe portion, and the small diameter probe portion has a role to be plunged into the area to be welded, and the large diameter shoulder portion has a role to ensure the amount of frictional heat required for smooth material flow and to suppress burrs. In the tool having this configuration, the size of the tool is determined mainly by the shoulder portion, making it difficult to reduce the size (diameter) of the tool. As a result, it is difficult to limit the friction stir region, and the conventional tool cannot be used in cases where the friction stir region is limited, such as when welding small metal members or members having complex shapes.

On the other hand, in Patent Literature 1 (Japanese Unexamined Patent Publication No. 2018-001261), there is proposed a friction stir welding tool comprising a base material, and a coating film which covers at least a part of the base material, wherein the coating film includes a compound, the compound contains a first element and a second element, the first element being at least one kind selected from a group consisting of elements of Group 4, elements of Group 5, elements of Group 6 in the periodic table, aluminum and silicon, the second element being at least one kind selected from a group consisting of carbon, nitrogen, oxygen and boron, the coating film includes a rough surface region, the rough surface region includes plural recess portions, a depth of the recess portion from an average surface of the rough surface region being 0.5 μm or more, in the rough surface region, the coating has a thickness of 2 μm or more and 12 μm or less.

In the friction stir welding tool described in Patent Literature 1, it is said that, when the coating film contains a specific compound and contains a specific rough surface region, the rough surface region can be processed even if processing is repeated, because that frictional heat is efficiently generated because an appropriate roughness is maintained for a long period of time. Further, it is said that, as a result, the welding time is shortened, the amount of wear of the coating film per spot is also reduced, which results in establishing longer life of the friction stir welding tool.

Further, in Patent Literature 2 (Japanese Unexamined Patent Publication No. 2018-039027), there is proposed a friction stir welding method for welding a pair of metal members by friction stir welding, comprising a step of fixing the pair of metal members so that the end side surfaces included in the welding region by the friction stir welding face each other, and a step of friction stir welding. In the friction stir welding step, the probe held by the processing tool protruding from the tool body is pressed against the pair of metal members from the upper side of the end side surface while being rotated together with the tool body, and moving relatively along a welding line of the pair of metal members in the region. In the fixing step, the pair of metal members are fixed so that at least the side surface of the tool body of the facing end side surfaces of the pair of metal members are separated by a distance shorter than the radius of the probe in at least a region of the welding line.

Here, in Patent Literature 2, it is said that the metal material is softened by the frictional heat generated by the rotation of the probe and exists at the base of the probe, and the metal material present on the side of the base of the probe affects the amount of heat storage at the base of the probe and further prevents the movement of the probe along the welding line. In the friction stir welding method described in Patent Document 2, the amount of metal material that is softened by frictional heat and exists on the side of the base of the probe is reduced by separating the end side surfaces at a distance shorter than the radius of the probe. Therefore, according to this form of friction stir welding, the amount of heat stored at the base of the probe can be reduced to suppress the melting damage of the components of the probe, and the prevention to the movement of the probe along the welding line can be reduced. As a result, according to this manner of friction stir welding method, the life of the probe can be extended.

PRIOR ART DOCUMENTS

Patent Literature

Patent Literature 1: Japanese Unexamined Patent Application Publication No. 2018-001261

Patent Literature 2: Japanese Unexamined Patent Application Publication No. 2018-039027

SUMMARY OF THE INVENTION

Problem to be Solved by the Invention

However, in the friction stir welding tool disclosed in Patent Literature 1, in addition to the fact that the tool life is rate-determined by the surface state of the thin film, since the materials to be welded by friction stir welding are diverse, and universal improvement of the life of the tool cannot be achieved. Furthermore, the friction stir welding tool is intended for spot welding, and it cannot be expected that the tool life will be improved for line welding where the welding time inevitably increases as compared with spot welding.

Further, in the friction stir welding method disclosed in Patent Literature 2, it is necessary to accurately separate the short side surfaces of the material to be welded, which not only complicates the welding process but also increases the welding cost. In addition, such the separation significantly limits the proper welding conditions under which a good stir zone without defects can be obtained.

Furthermore, in the friction stir welding tool disclosed in Patent Literature 1 and the friction stir welding method disclosed in Patent Literature 2, a tool of the conventional shape is used, and minimization of the friction stir region has not been considered at all.

Considering the above problems in the prior arts, an object of the present invention is to provide a simple and efficient friction stir welding method which not only enables localized friction stir welding, but also provides a smooth friction stir surface and can extend the life of the tool.

Means to Solve the Problems

In order to achieve the above object, the inventors have conducted intensive study as to the tool shapes and friction stir welding conditions used in friction stir welding, and have found that moving the tool while slanted toward the retreating side relative to the welding direction is extremely effective, and have reached to the present invention. Here, in the friction stir welding, the side where the rotation direction of the tool and the moving direction coincide is called the advancing side (AS), and the opposite side is called the retreating side (RS).

Namely, the present invention provides a friction stir welding method characterized by:

- pressing a tip end of a tool that is rotated at a prescribed speed into a material to be welded,
- forming a stir zone by moving the tool in an arbitrary welding direction, and
- slanting the tool toward the retreating side relative to the welding direction during the moving.

In the friction stir welding, it is known that, when setting an advance angle of the tool relative to the welding direction, the material flow formed around the tool becomes smooth, and the range of appropriate welding conditions (tool rotation speed, welding speed, etc.) for obtaining a defect-free joint is expanded. In contrast, the friction stir welding method of the present invention is most characterized in that the tool is slanted toward the retreating side to perform the friction stirring. By slanting the tool toward the retreating side, the formation of burrs can be effectively suppressed, and, for example, even when the tool having a simple shape (rod shape) without a shoulder portion is used, a good stirring region can be formed. Here, "slanting toward the retreating side" may be performed by either slanting the tool toward the surfaces of the material to be welded, or slanting the surface of the material to be welded toward the tool. Further, the present invention is not limited to welding, but can also be applied to a friction stir process in which the principle of friction stir welding is utilized for surface modification as it is.

The reason why the formation of burrs is suppressed by the friction stirring with the tool slanted toward the retreating side is not entirely clear, but it is considered to be due to the change in the tool surface area that abuts the material to be welded on the advancing side and the retreating side. More specifically, by slanting the tool toward the retreating side, the surface area of the tool on the advancing side decreases and the surface area of the tool on the retreating side increases. In the conventional friction stir welding, the burrs are formed on the retreating side, however, in the friction stir welding method of the present invention, as the tool surface area on the retreating side increases, the amount of friction heat in the retreating side region increases, and it is considered that the formation of burrs is suppressed by promoting material flow.

In the friction stir welding method of the present invention, it is preferable that the tool does not have a shoulder portion. By using the tool that does not have a shoulder portion (that is a tool having only a probe portion), the diameter of the tool can be made small, and it is possible to perform the friction stir welding, even when the region to be welded is narrow. On the other hand, as the probe portion, since it is possible to make larger in diameter than conventional general tools, breakage of the tool can be effectively suppressed.

Further, in the friction stir welding method of the present invention, it is preferable that the tip portion is formed into a spherical crown shape or a conical shape. By making the tip of the tool that is plunged into the area to be welded spherical crown or conical, it is possible to reduce the resistance applied to the tool during friction stir welding while generating the material flow required to form the stir zone. As a result, the life of the tool can be effectively extended.

Further, in the friction stir welding method of the present invention, it is preferable that the above slanting angle is set to 1 to 20°. By setting the slanting angle of the tool toward the retreating side to 1° or more, it is possible to obtain a burr suppression effect, and even when the angle is made larger than 20°, the burr suppression effect cannot be improved.

In the friction stir welding method of the present invention, it is preferable to provide an advance angle to the tool. By providing the advance angle in addition to slanting the tool to the retreating side, it is possible to obtain the effects achieved by providing the conventionally known advance angle, such as expansion of suitable welding conditions. The advance angle to be set is not particularly limited as long as the effects of the present invention are not impaired, and any conventionally known angle may be used, but it is preferably 0.5 to 7°, more preferably 2 to 5°.

Further, in the friction stir welding method of the present invention, it is preferable that the diameter of the tool is 3 to 20 mm. By making the diameter of the tool 3 mm or more, it is possible to suppress the breakage of the tool, and by making 20 mm or less, in addition to being able to form the localized stirring region, it becomes easier for the tool to access the processing region. The diameter of the tool is more preferably between 5 and 15 mm, most preferably between 8 and 12 mm.

Further, in the friction stir welding method of the present invention, it is preferable that the material to be welded is made of aluminum material or an aluminum alloy material, and the tool is made of tool steel. By using the aluminum material or the aluminum alloy material as the material to be welded, it is possible to easily perform the plunging of the tool and the friction stir welding. Further, the friction stirring of the aluminum material or the aluminum alloy material can be adequately performed by using a tool made of tool steel, and by using the tool steel for the tool it is possible to allow the tool inexpensive.

Further, in the friction stir welding method of the present invention, it is preferable that the material to be welded is a steel material and the tool is made of cemented carbide or ceramics. The steel material is the most widely used metal structural material, and by using the steel material as the material to be treated or material to be welded, a wide variety of metal structures can be obtained. Further, by using the tool made of the cemented carbide or ceramics, it is possible to perform the friction stir welding of the steel material, and in addition, since the shape of the tool used in the friction stir welding method of the present invention is simpler than that of conventional tools, it possible to manufacture an inexpensive tool having a long life.

Further, in the friction stir welding method of the present invention, it is preferable to dispose a burr suppression jig on the outer edge of the tool. In the friction stir welding method of the present invention, by slanting the tool toward the retreating side, the formation of burrs can be effectively suppressed, and, for example, even when the tool having a simple shape (rod shape) without a shoulder portion is used, a good stirring region can be formed, and the formation of burrs can be more reliably suppressed by placing the burr suppression jig on the outer edge of the tool. The burr suppression jig only needs to press the area where the burrs would be formed when no jig is used and the vicinity of the area, and the shape, arrangement position, and the like of the jig may be appropriately adjusted.

Furthermore, in the friction stir welding method of the present invention, it is preferable that the advancing side of the tool plunged into the material to be welded is forcibly cooled. When the tool does not have a shoulder, excessive heat generation on the advancing side will result in significant formation of burrs on the retreating side. On the other hand, by appropriately forcibly cooling the advancing side, the formation of burrs can be suppressed. On the other hand, heating the retreating side can reduce the required slant angle.

Effects of the Invention

According to the present invention, in addition to enabling localized friction stir welding, it is possible to provide a simple and efficient friction stir welding method which provides a smooth friction stir surface and can extend the life of the tool.

BRIEF DESCRIPTION OF THE DRAWINGS

FIG. 1 is a schematic diagram of a conventional general friction stir welding.

FIG. 2 is a schematic view of a conventional general friction stir welding tool.

FIG. 3 is a schematic view showing a state in which the tool is provided with the advance angle.

FIG. 4 is a schematic view showing the state in which the tool is provided with a retreating side slanting angle in the present invention.

FIG. 5 is a schematic view of the spherical crown shaped tool that can be suitably used in the present invention.

FIG. 6 is a schematic view of the tapered tool that can be suitably used in the present invention.

FIG. 7 is a schematic diagram showing an example of one embodiment of the present invention by using the spherical crown shaped tool.

FIG. 8 is a schematic view of the tool made of tool steel used in Example 1.

FIG. 9 is a photograph showing the appearance of each stirred section obtained in Example 1.

FIG. 10 shows profiles of the shape of the surface of the stir zones obtained with retreating side slanting angles of 0° and 7°.

FIG. 11 is a schematic view of a tool made of tool steel used in Example 2.

FIG. 12 shows photographs of the appearance of the stirring portions obtained in Example 2.

FIG. 13 shows a photograph of the appearance of the joint obtained in Example 3 with a retreating tool slanting angle of 7° and a tool advance angle of 1°.

FIG. 14 shows photographs of the appearance of the stir zones obtained in Example 3 with the tool advance angle of 1° and the retreating tool slanting angles of 3°, 5°, 7°, and 9°.

FIG. 15 shows photographs of the appearance of the tool in Example 4 (before welding and after five welding operations).

FIG. 16 shows surface profiles of the tool in Example 4 (before welding and after five welding operations).

FIG. 17 shows a photograph of the appearance of the stir zone obtained in Comparative Example 1.

FIG. 18 shows profiles of the shape of the surface of the stir zones obtained in Comparative Example 1.

FIG. 19 shows a photograph of the appearance of the joint obtained in Comparative Example 2.

MODE FOR CARRYING OUT THE INVENTION

In the following, typical embodiments of the friction stir welding tool and the friction stir welding method of the present invention are explained by referring the drawings, but the present invention is not limited only to these embodiments. In the following description, the same or corresponding part is designated by the same symbol, and there is a case that the redundant explanation is omitted. Further, since the drawing is to explain the concept of the present invention, there is a case that the sizes of the illustrated elements and a ratio thereof are different from the real case.

The present invention relates to a friction stir welding method and a friction stir processing method, and although the friction stir welding and the friction stir processing have different purposes, they share the same basic principle.

Here, the friction stir welding includes the following four embodiments (1) to (4) or combination thereof, that is, (1) the welding where the ends of the metal plates are butted against each other to form a portion to be welded, and the rotating tool is moved along the longitudinal direction of the portion to be processed while rotating to weld the metal plates with each other, (2) the spot welding where the ends of the metal plates are butted against each other to form a portion to be welded, and the rotation tool is rotated and welded without moving at the portion to be welded, (3) the spot welding where the metal plates are overlapped at a portion to be welded, the rotating tool is inserted to the portion to be welded and the rotating tool is rotated at that point without moving to weld the metal plates, and (4) the welding where the metal plates are overlapped at a portion to be welded, the rotating tool is inserted to the portion to be welded and the rotating tool is moved along the longitudinal direction of the portion to be processed while rotating to weld the metal plates with each other, however, the friction stir welding of the present invention is directed to (1) and (4) in which the tool is moved in the welding direction (processing direction), and combinations thereof.

In the following, as a representative embodiment, "(1) the welding where the ends of the metal plates are butted against each other to form a portion to be welded, and the rotating tool is moved along the longitudinal direction of the portion to be processed while rotating to weld the metal plates with each other" is described in detail. In FIG. 1, a schematic diagram of a conventional general friction stir welding is shown. A schematic view of a conventional general friction stir welding tool is shown in FIG. 2.

One member 2 to be welded and the other member 4 to be welded are butted together, and a rotating tool 6 is plunged into the area including the butt surfaces to generate frictional heat and form a material flow area around the plunged tool 6. Thereafter, the tool 6 is moved along the butt line to form a stir zone 8, thereby achieving the friction stir welding. Here, the side where the rotation direction of the tool 6 and the moving direction coincide is called the advancing side (AS), and the opposite side is called the retreating side (RS).

Here, the conventional general tool 6 has a large-diameter main body portion 10 and a probe portion 12 provided on the bottom surface of the main body portion 10, as shown in FIG. 2. Basically, the probe portion 12 is plunged into the materials to be welded (2, 4), and the tool often reaches its end of life due to breakage of the base of the probe portion 12.

Further, the burrs often form on the retreating side, but the mechanism for preventing the formation of such burrs is achieved by pressing down the material friction-stirred by the probe portion 12 with the bottom surface (shoulder) of the main body portion 10. Further, by providing the advance angle to the tool 6 as shown in FIG. 3, the material flow can be made smooth, and tunnel-like defects and groove-like surface defects can be suppressed, as well as the formation of burrs.

In contrast, in the friction stir welding method of the present invention, the most characterized feature is in that the tool 6 is slanted to the retreating side as shown in FIG. 4. By slanting the tool 6 to the retraction side, it is possible to suppress the formation of burrs effectively regardless of the shape of the tool 6.

Further, since the formation of burrs can be suppressed by slanting the tool 6 toward the retracting side, there is no need to provide the main body portion 10 (shoulder) and the probe portion 12 individually. Therefore, in the friction stir welding method of the present invention, it is preferable to use the tool having a shape as shown in FIG. 5 and FIG. 6. By using the tool that does not have a shoulder (that is, a tool having only the probe portion 12), the diameter of the tool 6 can be made thin, and the friction stir welding can be performed even when the region to be welded is narrow. On the other hand, since the probe portion 12 can be made larger in diameter than the conventional tool 6, it is possible to suppress the breakage of the tool 6 effectively.

The tool 6 shown in FIG. 5 has the spherical crown shaped tip, which can reduce the resistance applied to the tool 6 during friction stir welding while generating the material flow required to form the stir zone 8. As a result, the life of the tool 6 can be effectively extended. Further, the tool 6 shown in FIG. 6 has the conical shaped tip, which can reduce the resistance applied to the tool 6 during friction stir welding while generating the material flow required to form the stir zone 8. As a result, the life of the tool 6 can be effectively extended. Here, when priority is given to tool life, it is preferable that the tip of the tool 6 may have the spherical crown shape, whereas when priority is given to suppressing the burr formation, it is preferable that the tip of the tool 6 may have the conical shape.

When the tip of the tool 6 is made conical, it is preferable to provide a suitable curved surface at the very tip in order to prevent damage when the tool 6 is plunged into or moved. Further, the taper angle of the conical shape is not particularly limited, and may be appropriately adjusted depending on the desired depth of the stir zone 8, the material of the materials (2, 4) to be welded and the friction stir welding conditions.

Further, the diameter of the tool 6 is preferably set to 3 to 20 mm. By making the diameter of the tool 6 3 mm or more, it is possible to suppress the breakage of the tool 6, and by making the diameter 20 mm or less, it is possible to form a stir zone 8 locally and, in addition, to make it easier for the tool 6 to access the area to be processed. More preferably, the diameter of the tool 6 is set to 5 to 15 mm, and most preferably set to 8 to 12 mm.

Further, when the materials to be welded (2, 4) are aluminum material or an aluminum alloy material, it is preferable that the tool 6 is made of tool steel. By using the aluminum material or the aluminum alloy material as the material to be welded (2, 4), the tool 6 can be easily plunged into and friction-stirred. Further, the friction stirring of the aluminum material or the aluminum alloy material can be adequately performed by using the tool made of tool steel, and in addition, by using tool steel, it is possible to make the tool inexpensive.

Further, when the materials to be joined (2, 4) are steel materials, examples of the material of the tool 6 include, for example, cemented carbide, cermet, ceramics (silicon nitride, sialon, pc-BN, etc.), tungsten alloy, iridium alloy, cobalt alloy, and the like, but it is preferable to use cemented carbide or ceramics. The steel material is the most widely used metal structural material, and by using the steel material as the material (2, 4) to be welded, a wide variety of metal structures can be obtained. Further, by using the tool made of the cemented carbide or ceramics, it is possible to perform the friction stir welding of the steel material, and in addition, since the shape of the tool 6 used in the friction stir welding method of the present invention is simpler than that of conventional tools, it possible to manufacture an inexpensive tool having a long life.

FIG. 7 is a schematic diagram of the friction stir welding by using the tool 6 having a spherical crown shaped tip as shown in FIG. 5. Although the tool 6 does not have a shoulder to suppress the material flow, the formation of burrs can be effectively suppressed by moving the tool 6 in the welding direction while slanting it backward. It is preferable that the angle of slanting toward the retreating side is 1 to 20°. By setting the slanting angle of the tool toward the retreating side to 1° or more, it is possible to obtain the burr suppression effect, and even when the angle is larger than 20°, the burr suppression effect cannot be improved. The more preferable slanting angle is 3 to 15°, and the most preferable slanting angle is 5 to 10°.

In the state shown in FIG. 7, it is not always necessary to impart an advance angle to the tool 6, but by providing an appropriate advance angle, the material flow can be made smoother. The advance angle to be set is not particularly limited as long as the effects of the present invention are not impaired, and may be conventionally known angle, but is preferably 0.5 to 7°, and more preferably 2 to 5°.

Further, it is preferable to dispose a burr suppression jig on the outer edge of the tool 6. By slanting the tool 6 toward the retreating side, the formation of burrs can be effectively suppressed, and, for example, even when the tool 6 having a simple shape (rod shape) without a shoulder portion is used, a good stirring portion 8 can be formed, and the formation of burrs can be more reliably suppressed by placing the burr suppression jig on the outer edge of the tool 6. The burr suppression jig only needs to press the area where the burrs would be formed when no jig is used and the vicinity of the area, and the shape, arrangement position, and the like of the jig may be appropriately adjusted.

Furthermore, it is preferable that the advancing side of the tool 6 plunged into the material (2, 4) to be welded is forcibly cooled. When the tool 6 does not have a shoulder, excessive heat generation on the advancing side will result in significant formation of burrs on the retreating side. To the contrary, by appropriately forcibly cooling the advancing side, the formation of burrs can be suppressed. The method of forced cooling is not particularly limited, and cooling by injecting air or an inert gas, water cooling, cooling with liquid nitrogen or liquid $CO_2$ and the like can be used, but the cooling can be most efficiently achieved by using liquid $CO_2$. On the other hand, heating the retreating side can reduce the required slant angle.

Note, the friction stir welding apparatus for performing the friction stir welding of the present invention is not particularly limited as long as being capable of slanting the tool 6 to the retreating side, and various conventionally known friction stir welding apparatuses can be used. The method of controlling the friction stir welding is also not particularly limited, and the position control of the tool 6, the load control, the torque control, and the like can be used.

Although the typical embodiments of the present invention have been described above, the present invention is not limited to these, and various design changes are possible, and all of these design changes are included in the technical scope of the present invention.

EXAMPLES

Example 1

Aluminum alloy sheets (A6061-T6) of 300 mm in length, 100 mm in width and 5 mm in thickness were used as the materials to be welded, and the friction stir welding was performed by using a tool made of tool steel having the shape shown in FIG. 8. The two aluminum alloy sheets were butted together at a surface of 300 mm×5 mm, and the tool was plunged into the sheets so that the butted surface was at the center of the tool.

The friction stir welding was performed under the constant position control in which the tool rotation speed was set to 500 rpm, the movement speed (welding speed) was set to 100 mm/min, the tool advance angle was fixed at 3°, and the tool insertion amount was set to 3.3 mm. Further, in order to clarify the effect of the tool slanting toward the retreating side (retreating side tool slanting angle) on the suppression of burrs and the surface condition of the stir zone, the retreating side tool slanting angle was changed to 0°, 3°, 5°, and 7°.

FIG. 9 shows the surface appearances of the stir zone obtained when the retreating side slanting angles were 0°, 3°, 5° and 7°. It can be seen that the formation of burrs is suppressed as the retreating side slanting angle increases, and at 7°, almost no burrs are formed. Further, when the cross section of the stir zone was observed, no defect was found.

FIG. 10 shows the surface shape profiles in the cross section perpendicular to the welding line direction for the stir zones obtained when the retreating side slanting angles were 0° and 7°. It can be seen that when the retreating side slanting angle is 7°, the amount of metal loss in the stir zone is reduced compared to when the retreating side slanting angle is 0°. Since the burrs are material that is removed from the friction-stirred region, the amount of material removed can be suppressed by providing the retreating side slanting angle, and a good stir zone with little metal loss is formed.

Example 2

The friction stir welding was carried out in the same manner as in Example 1, except that the friction stir welding was carried out by using a tool made of steel tool having the shape shown in FIG. 11. FIG. 12 shows a photograph of the appearance of the stir zone obtained when the tool slanting angle toward the retreating side was set to 7°. For comparison, the photograph of the appearance of the stir zone obtained in Example 1 when the retreating side slanting angle was set to 7° is also shown, and it can be confirmed that the use of the taper shaped tool more effectively suppresses the formation of burrs.

Example 3

Hot-rolled steel sheets (SPHC-P) of 300 mm in length, 100 mm in width and 5 mm in thickness were used as the materials to be welded, and the friction stir welding was performed by using a cemented carbide tool having the shape shown in FIG. 8. The two hot-rolled steel sheets were butted together at a surface of 300 mm×5 mm, and the tool was plunged into the steel sheets so that the butted surface was at the center of the tool.

The friction stir welding was performed under the constant position control in which the tool rotation speed was set to 700 rpm, the movement speed (welding speed) was set to 300 mm/min, the tool advance angle was fixed at 3° or 1°, and the tool insertion amount was set to 3.5 mm. Further, in order to clarify the effect of the tool slanting toward the retreating side (retreating side tool slanting angle) on the suppression of burrs and the surface condition of the stir zone, the retreating side tool slanting angle was changed to 3°, 5°, 7° and 9°. Note, argon gas was flowed in the tool plunging region and the vicinity thereof to prevent oxidation.

FIG. 13 shows the photograph of the appearance of a joint obtained when the retreating tool slanting angle was set to 7° and the tool advance angle was set to 1°. It can be seen that by setting an appropriate retreating tool slanting angle, the formation of burrs is effectively suppressed.

FIG. 14 shows the photographs of the appearance of the stir zone obtained when the tool advance angle was set to 1° and the retreating tool slanting angles were set to 3°, 5°, 7° and 9°. It can be seen that the size of the burrs varies depending on the retreating side tool slanting angle, and when the retreating side slanting angles are 7° and 9°, the formation of burrs is significantly suppressed.

Example 4

Hot-rolled steel sheets (SPHC-P) of 350 mm in length, 150 mm in width and 5 mm in thickness was used as the materials to be welded, and the friction stir welding was performed by using a cemented carbide tool having the shape shown in FIG. 8. The star-in-plate technique was carried out in which the tool was plunged into the widthwise center of the hot-rolled steel sheets and moved along the widthwise centerline.

The conditions of the friction stir welding were the tool rotation speed of 700 rpm, the welding speed of 300 mm/min, the insertion amount of 3.5 mm, the tool advance angle of 1°, and the welding distance per one time of 300 mm, and the welding was performed five times.

FIG. 15 shows the photographs of the appearance of the tool before welding and after five welding runs were performed. The tool does not break during the welding, and no change in tool shape due to the welding is observed in view of appearance. From these results, it can be seen that the friction stir welding of the present invention is an extremely useful welding method for friction stir welding of steel materials, where tool life is problem to be solved.

To investigate the change in the tool shape before and after welding, the surface shape of the tool was measured by using a 3D shape measuring device (Keyence Corporation, VR-3200). The display resolution of the measuring device is 0.1 $\mu m^2$, and the measurement accuracy is ±3 $\mu m^3$ for height measurement and 5 μm for width measurement. The surface profile of the tool before welding and after five welding runs is shown in FIG. 16. Slight wear was observed at the position about 3 mm away from the tip of the tool, but it can be seen that there was almost no wear near the tip of the tool.

Comparative Example 1

The friction stir welding was performed in the same manner as in Example 1, except that the tool was slanted 7° in the advancing side.

The photograph of the appearance of the resulting stir zone is shown in FIG. 17. It can be seen that when the tool is slanted toward the advancing side, the burrs are significantly formed on the retreating side.

FIG. 18 shows the surface shape profile in the cross section perpendicular to the welding line direction for the stir zone obtained when the advancing side slanting angle was 7°. Further, for comparison, the results of the stir zones when the retreating side slanting angle was set to 7° and when only the advance angle of 3° was applied are shown together. It can be seen that when the slanting angle is provided on the advancing side, the amount of metal loss increases compared to when only the advance angle is provided.

Comparative Example 2

The friction stir welding was performed in the same manner as in Example 3, except that the advancing side slanting angle was set to 3° and no retreating side slanting angle was provided. The photograph of the appearance of the resulting joint is shown in FIG. 19. It can be seen that when no retreating side slanting angle is provided, the burrs are significantly formed on the retreating side.

EXPLANATION OF SYMBOLS

2 . . . One member to be welded,
4 . . . Other member to be welded,
6 . . . Tool,
8 . . . Stir zone,
10 . . . Main body portion,
12 . . . Probe portion.

The invention claimed is:

1. A friction stir welding method comprising:
pressing a tip end of a tool that is rotated at a prescribed speed into a material to be welded, forming a stir zone by moving the tool in an arbitrary welding direction, and
slanting the tool toward a retreating side relative to the welding direction during the moving, wherein
the retreating side is oriented in a direction perpendicular to a moving direction in which the tool moves during the moving and is a side where a rotation direction of the tool is opposite the moving direction of the tool,
the tool does not have a shoulder portion, and
the tip end is formed into a spherical crown shape or a conical shape.

2. The friction stir welding method according to claim 1, wherein the slanting angle is 1 to 20°.

3. The friction stir welding method according to claim 1, wherein an advance angle is provided to the tool.

4. The friction stir welding method according to claim 1, wherein the tool includes:
a rod having a diameter; and
a rounded tip portion connected to the rod, and
the diameter of the rod of the tool is 3 to 20 mm.

5. The friction stir welding method according to claim 1, wherein
the material to be welded is aluminum material or an aluminum alloy material, and
the tool is made of tool steel.

6. The friction stir welding method according to claim 1, wherein
the material to be welded is a steel material, and
the tool is made of cemented carbide or ceramics.

7. The friction stir welding method according to claim 1, wherein an advancing side of the tool plunged into the material to be welded is forcibly cooled.

8. The friction stir welding method according to claim 1, wherein the slanting angle is 3 to 15°.

9. A friction stir welding method comprising:
pressing a tip end of a tool that is rotated at a prescribed speed into a material to be welded,
forming a stir zone by moving the tool in a first direction, and
slanting the tool in a second direction perpendicular to the first direction toward a retreating side where a rotation direction of the tool is opposite the first direction during the moving, wherein
the tool does not have a shoulder portion, and
the tip end is formed into a spherical crown shape or a conical shape.

10. The friction stir welding method according to claim 9, wherein the slanting angle is 3 to 15°.

11. The friction stir welding method according to claim 1, wherein a material and a thickness are the same between the members to be welded.

12. The friction stir welding method according to claim 9, wherein a material and a thickness are the same between the members to be welded.

* * * * *